(12) United States Patent
McIntosh et al.

(10) Patent No.: US 10,370,194 B2
(45) Date of Patent: Aug. 6, 2019

(54) PRESSURE SEALED HIGH TEMPERATURE ELEVATING CONVEYOR

(71) Applicant: Olds Elevator, LLC, Hudson, NH (US)

(72) Inventors: Richard S. McIntosh, Boxford, MA (US); William N. Skelly, Hudson, NH (US); Jack Gilchrist, Hudson, NH (US)

(73) Assignee: Olds Elevator LLC, Hudson, NH (US)

( * ) Notice: Subject to any disclaimer, the term of this patent is extended or adjusted under 35 U.S.C. 154(b) by 0 days.

(21) Appl. No.: 15/927,685

(22) Filed: Mar. 21, 2018

(65) Prior Publication Data

US 2018/0208400 A1 Jul. 26, 2018

Related U.S. Application Data

(63) Continuation of application No. PCT/US2016/053341, filed on Sep. 23, 2016.

(60) Provisional application No. 62/232,056, filed on Sep. 24, 2015.

(51) Int. Cl.
| | |
|---|---|
| *B65G 33/14* | (2006.01) |
| *B65G 33/20* | (2006.01) |
| *B65G 33/26* | (2006.01) |
| *B65G 39/09* | (2006.01) |
| *B65G 65/46* | (2006.01) |
| *B65G 33/34* | (2006.01) |

(52) U.S. Cl.
CPC ............ *B65G 33/14* (2013.01); *B65G 33/20* (2013.01); *B65G 33/265* (2013.01); *B65G 33/34* (2013.01); *B65G 39/09* (2013.01); *B65G 65/463* (2013.01)

(58) Field of Classification Search
CPC .... B65G 69/0433; B65G 33/14; B65G 33/20; B65G 33/26; B65G 39/09; B65G 33/34; F27D 3/08
USPC ......... 198/657, 658, 670, 671; 414/158, 175
See application file for complete search history.

(56) References Cited

U.S. PATENT DOCUMENTS

| | | | |
|---|---|---|---|
| 2,692,067 A | 10/1954 | Hapman | |
| 3,135,377 A * | 6/1964 | Miley | .................... B65G 33/34 198/562 |
| 3,669,042 A * | 6/1972 | Lawrence | ............... E04H 12/28 110/184 |
| 3,896,923 A | 7/1975 | Griffith | |
| 4,024,947 A | 5/1977 | Knolle | |
| 4,106,999 A * | 8/1978 | Koppelman | ............ C10B 49/18 201/12 |
| 4,197,092 A * | 4/1980 | Bretz | ........................ C10J 3/487 110/101 R |
| 4,705,432 A * | 11/1987 | Harbolt | ............... C01B 17/0237 406/60 |
| 5,172,849 A | 12/1992 | Barten | |

(Continued)

FOREIGN PATENT DOCUMENTS

| | | |
|---|---|---|
| CN | 105314338 | 2/2016 |
| GB | 699962 | 11/1953 |
| KR | 101112753 | 3/2012 |

*Primary Examiner* — James R Bidwell
(74) *Attorney, Agent, or Firm* — Lambert Shortell & Connaughton; Gary E. Lambert; David J. Connaughton, Jr.

(57) ABSTRACT

A pressure sealed elevating conveyor for non-ambient temperatures having a pressure sealed shroud allowing lifting of a material while in a pressure sealed environment. In some embodiments, the pressure sealed elevating conveyor has structural details that allow the pressure sealed elevating conveyor to be used at very high or very low temperatures.

20 Claims, 5 Drawing Sheets

(56) References Cited

U.S. PATENT DOCUMENTS

| | | | |
|---|---|---|---|
| 5,257,586 | A | 11/1993 | Davenport |
| 5,868,234 | A | 2/1999 | Morimoto et al. |
| 6,368,555 | B1 | 4/2002 | Goeldner |
| 7,314,131 | B2 | 1/2008 | Olds |
| 8,282,332 | B2 | 10/2012 | Nill |
| 8,448,779 | B2 * | 5/2013 | Brock .................... B65G 33/20 198/662 |
| 2002/0195031 | A1 | 12/2002 | Walker |
| 2012/0067703 | A1 * | 3/2012 | Brock .................... B65G 33/20 198/658 |

* cited by examiner

PRESSURE SEALED HIGH TEMPERATURE ELEVATING CONVEYOR

FIELD OF THE INVENTION

This invention relates generally to elevating conveyors and, more particularly, to a pressure sealed elevating conveyor operating at non-ambient temperature.

BACKGROUND

There are many forms of conveyor mechanisms for transporting materials from one location to another. The choice of conveyor mechanism is made in accordance with many factors, including, but not limited to, the physical nature of the materials to be moved, the horizontal or vertical distances for material to be moved, and the temperature and pressure of the atmosphere in which the material is conveyed.

Conventional conveyor mechanisms are open to the general atmosphere, thus, are at atmospheric pressure. However, it is necessary for some materials to be moved while sealed against atmospheric pressure, and/or in a different gas environment.

It is also necessary to move some materials at a non-ambient temperature, higher or lower than ambient temperature. The different temperatures can present problems with expansion or contraction of conventional conveyor mechanisms, particularly at extremely elevated temperatures.

It would be desirable to provide a conveyor mechanism suitable for conveying materials in a pressure sealed environment subject, for example, to different gasses. In some embodiments, it would also be desirable to provide a pressure sealed conveyor mechanism suitable for conveying hot materials or cold materials, or to convey materials within a hot or cold atmosphere.

SUMMARY

The present invention provides a conveyor mechanism suitable for conveying materials in a pressure sealed environment. In some embodiments, the materials are moved while within a different gas. In some embodiments, the present invention also provides a conveyor mechanism suitable for conveying hot materials or cold materials.

In one aspect of the invention there is provided an elongate elevating conveyor for flowable materials, said conveyor comprising an inlet and an outlet, a helical screw shaft supported, in use, with a longitudinal axis in a substantially upright position. This screw shaft is secured to at least one end to a support structure, said screw shaft being secured against rotation about said longitudinal axis. A tubular barrel, herein referred to as a rotating or rotatable lift tube, surrounds said screw shaft and is rotatable coaxially therewith. A drive mechanism may rotatably drive said rotatable lift tube. A predefined working clearance between a cylindrical volume occupied by the helical screw shaft and an inner surface of said rotatable lift tube is such that, in use, a stable layer of flowable material is formed against the inner surface of said rotatable lift tube, said stable layer urging a mass of flowable material within said rotatable lift tube along an upward helical path by frictional engagement between the stable layer and the mass of flowable material. In some embodiments, a sweep member may project outwardly from an outer wall or surface of the rotatable lift tube, the sweep member may act to gather material to be urged into the rotatable tube.

In use, with screw shaft mounted as a stationary member with rotatable lift tube rotating thereabout, material in hopper is swept into the space between screw flights of the fixed screw shaft and the inner wall of rotatable lift tube and contacts the inner wall of rotatable lift tube.

Initially the mass of material resting against the inner wall of the rotatable lift tube rotates with the rotating lift tube until it engages an upper surface of an upwardly helical screw flight on the screw shaft. Continued rotation of the lift tube urges a mass of material to follow an upright path guided by the screw flight as a result of frictional engagement between the material and a thin layer of material in contact with the inner wall, the thickness of the thin layer corresponding to a clearance between the outer edge of flight and inner wall.

BRIEF DESCRIPTION OF THE DRAWINGS

The foregoing features of the invention, as well as the invention itself may be more fully understood from the following detailed description of the drawings, in which.

DETAILED DESCRIPTION

While pressure sealing is described herein, it should be understood that the pressure sealing can include zero pressure or atmospheric pressure. As used herein, the terms "pressure sealed" and "gas-tight" are used to mean similar things.

Figure 1:
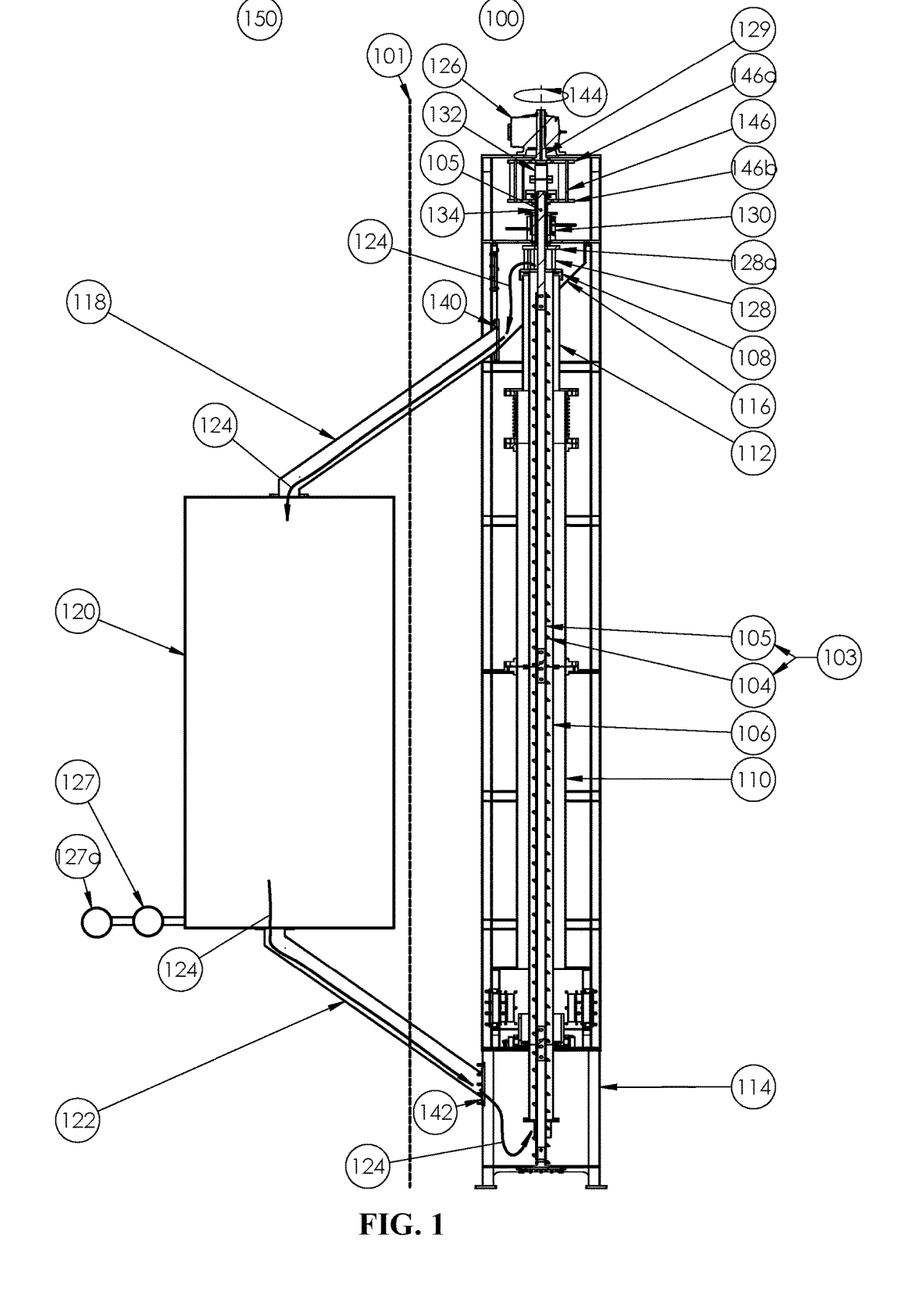
FIG. 1 is a diagram showing an example of a cross sectional view of an embodiment of an elevating conveyor capable of vertical lifting of bulk material, the elevating conveyor having a pressure sealed surrounding shroud tube, wherein the elevating conveyor has structural details that allow the bulk material to be very hot (or, in similar embodiments, very cold)

Referring to FIG. 1, an example of a pressure sealed elevator 100 is to the right of a dashed line 101, here shown in a closed loop with elements 150 to the left of the dashed line 101. The pressure sealed elevating conveyor of FIG. 2, FIG. 3, FIG. 4, and FIG. 5 is the same pressure sealed elevating conveyor in FIG. 1. Thus, reference is made to FIGS. 1-5 interchangeably.

The pressure sealed elevating conveyor 100 can include a rotating or rotatable lift tube 106 and a static screw 103 comprised of a screw flight 104 mounted on a screw shaft 105. The rotatable lift tube 106 may be a single piece, or may be formed of multiple sections, typically vertical sections. Similarly, the static screw 103 may be formed of a single length, or of multiple sections, typically vertical sections. Material is lifted by the lift tube along the path of the screw flight from the feed hopper 114 to the discharge head 116. The elevating conveyor 100 can be of a type described in U.S. Pat. No. 7,314,131, issued Jan. 1, 2008, and assigned to the assignee of the present invention, which patent is incorporated by reference herein in its entirety, and which patent is including herewith forming a part of the present application.

A gearmotor 126 (or any other structure capable of providing rotational movement) can be coupled to a drive shaft 129 that can rotate either clockwise or counterclockwise (as indicated by an arrow 144). The drive shaft 129 can be coupled to an upper squirrel cage 146, and more particularly, to an upper plate 146a of the upper squirrel cage 146. The upper squirrel cage 146 can include a lower plate 146b. A hollow drive shaft 134 can be coupled between lower plate 146b of the upper squirrel cage and the upper plate 128a of the lower squirrel cage 128, penetrating the discharge head 116 through a discharge head seal 130. A discharge head seal housing 131 can be coupled to a top part of the discharge head 116 and allows the hollow drive shaft 134 to rotate within it. A bottom plate 108, also referred to as a "slinger", of the lower squirrel cage 128 is coupled to the rotating (rotatable) lift tube 106.

Figure 4:
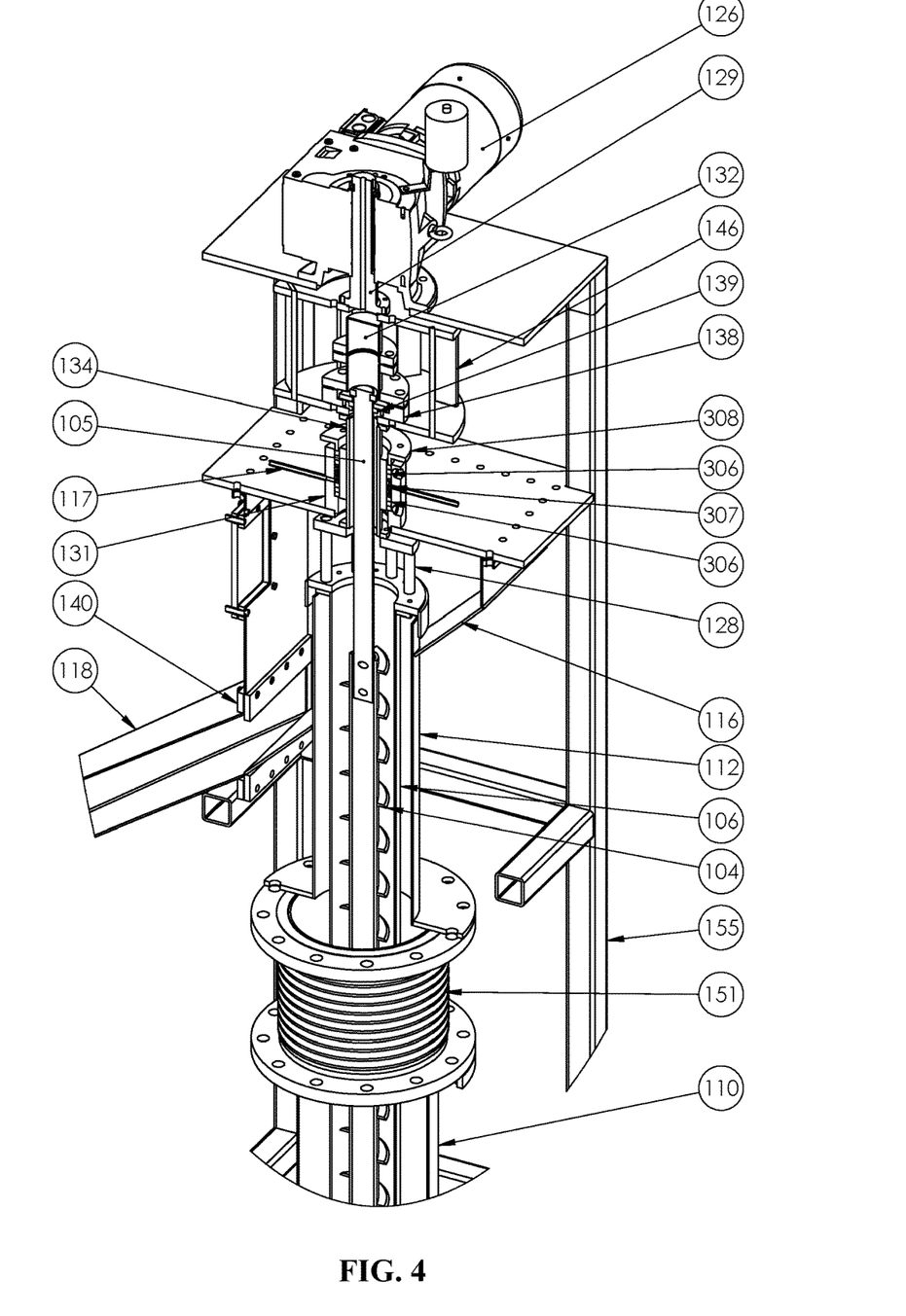
FIG. 4 is a cross sectional diagram showing an expanded view of the internals of a top portion of the elevating conveyor of FIG. 2.
Figure 5:
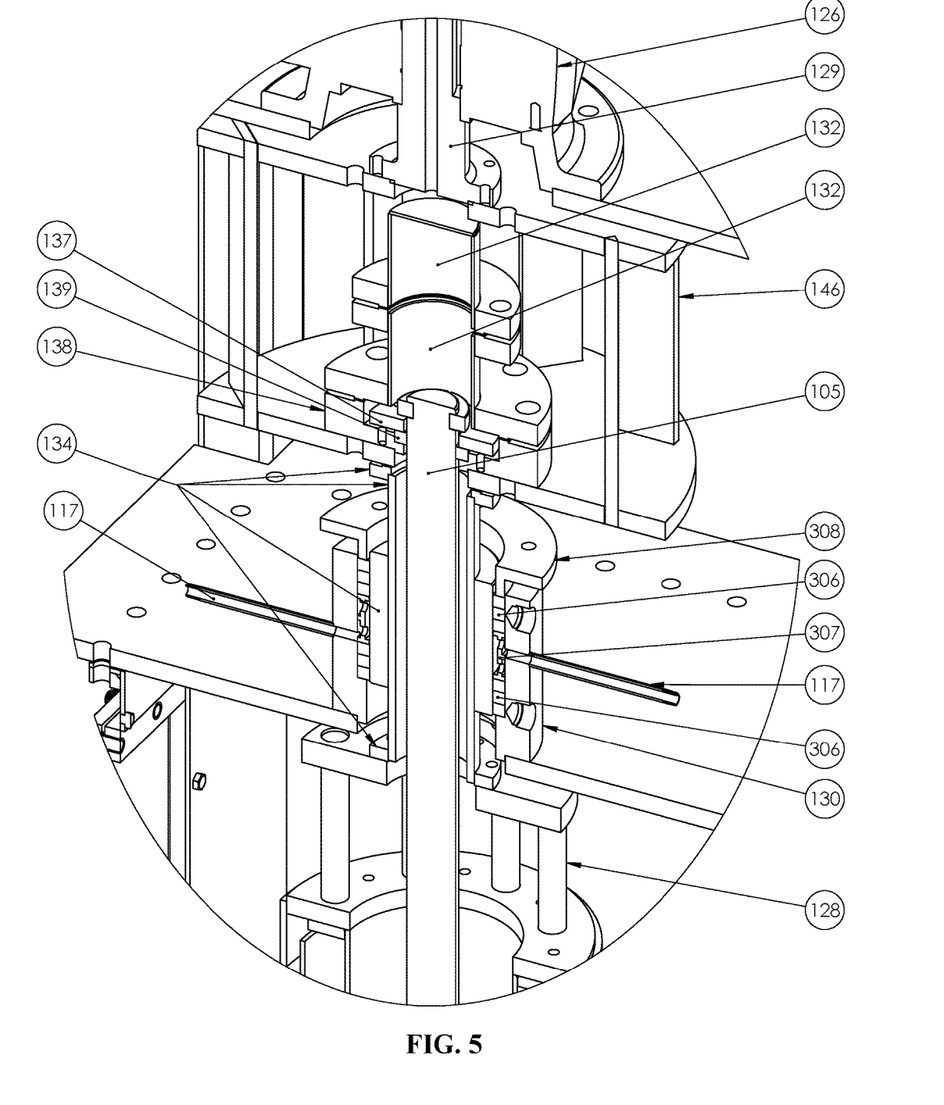
FIG. 5 is a cross sectional diagram showing a detail view of the internals of the top portion of the elevating conveyor of FIG. 2.

FIGS. 4 and 5 show a housing 138 for a screw shaft centering rope 139 can be coupled to the upper squirrel cage lower plate 146b. A screw shaft cap 132 can be coupled to the rope housing 138 to seal the screw shaft 105 penetration through the hollow drive shaft 134. The non-rotating screw shaft 105 can slide vertically through the hollow drive shaft 134 as the screw 103 expands or contracts and allows for this expansion and/or contraction length within the cap 132 while maintaining a gas tight or pressure tight seal.

To this end, in the arrangement shown, the discharge head seal 130 can make a seal between the rotating hollow drive shaft 134 and the discharge head 116. Further, in the arrangement shown, as stated above, the screw shaft cap 132 can form a seal over the end of the hollow drive shaft.

In some embodiments, the seal provided by the screw shaft cap 132 can be by way of a close fit metal to metal seal of a screw shaft bearing and the static screw shaft 105. In other embodiments, an O-ring or other sealing element can form the seal.

It should be understood that the drive shaft 129, the upper squirrel cage 146, the hollow drive shaft 134, the lower squirrel cage 128, the lower plate 108, and the rotating lift tube 106 are all coupled together and are all operable to be turned by operation of the gearmotor 126.

It should be understood that the assembly formed by the hollow drive shaft 134, the discharge head seal 130, and the screw shaft cap 132 provides a gas tight or a pressure sealed arrangement and for which the lower squirrel cage can be rotated by the gearmotor 126, and for which the upper end of screw 103 can move linearly upward or downward due to expansion or contraction. Further details of the above assembly are described below in conjunction with FIG. 4.

In operation, the gearmotor 126 is operable to turn the rotating lift tube 106 in a direction 144 (clockwise or counterclockwise), resulting in bulk material being urged upward or downward (depending upon a rotation direction of the rotating lift tube 106) in the elevating conveyor 100. The slinger 108 is operable to keep lifted bulk material from entering the vertical pipe 112.

Other bearings and/or support members (not shown) can support an upper end of the static screw shaft 105 either inside of cap 132 or without it if the support member provides sufficient sealing.

In other embodiments, other arrangements of seals and bearings in and around the discharge head 116 are possible. In some embodiments, the discharge head seal 130 forms not only the above-described seal between the hollow drive shaft 134, and the discharge head 116, but also forms the above-described seal with the static screw shaft 105. For this arrangement, the screw shaft cap 132 need not be used. In some embodiments, the upper squirrel cage 146 is not used. For these embodiments, the hollow drive shaft 134 can be longer and can be coupled to the drive shaft 129.

Further operation of the lifting provided by the elevating conveyor 100 is described in U.S. Pat. No. 7,314, 131, incorporated herein by reference, as mentioned above.

In FIG. 1, bulk material, represented by arrows 124, lifted up through the elevating conveyor, from the feed hopper 114 to the discharge head 116, discharges out of a discharge chute 118. The discharge chute 118 can be coupled to the discharge head 116 at an output port 140 with a pressure sealed coupling mechanism, for example, a flange and gasket (as shown). The discharge chute 118 may or may not be an integral part of the pressure sealed elevating conveyor 100.

In some embodiments, the material 124 can pass into an external chamber 120 or assembly and out of the assembly 120 back to the feed hopper 114 via an inlet chute 122. The inlet chute 122 can be coupled to the feed hopper 114 at an input port 142 with a pressure sealed coupling mechanism, for example, a flange and gasket (as shown). The inlet chute 122 may or may not be an integral part of the pressure sealed elevating conveyor 100.

It will be understood that the pressure sealed elevating conveyor 100 in combination with elements 150 can form a closed loop pressure sealed system in which the bulk material 124 can move. The elements in 150 need not be closed loop if mechanisms to contain pressure at process inlet and outlet points are provided, thus creating a closed pressurized system.

The elevating conveyer 100 can be enclosed by making gas tight four areas:
1. The penetration of the rotating lift tube 106 through the top of the feed hopper 114;
2. The penetration of the rotating drive shaft 134 through the top and bottom of the discharge head 116;
3. The penetration of the static screw shaft (or extension) 105 through the drive shaft 134, and;
4. Any access or drain ports, and component connection points.

As shown in the Figures, the penetration of the rotating lift tube through the top of the feed hopper (area 1) can be sealed by attaching a shroud body 152 to the top of the feed hopper. The shroud 110 can continuously contain the lift tube and attach to the vertical pipe 112 of the discharge head, effectively containing the rotating components. The shroud allows sealing of the rotating lift in both the rotational direction and the vertical movement associated with elongation or contraction from temperature variation at both the hopper top penetration and the discharge head vertical pipe penetration.

As seen in FIGS. 4 and 5, the penetration of the rotating drive shaft through the top of the discharge head (area 2) can be sealed with a DH seal 130 consisting of a housing 131 containing compression ropes 306 and a fluid purged lantern ring 307, inlet and outlet fluid purge piping 117 and a compression plate 308. This allows sealing the drive shaft in both a rotational movement and a vertical movement associated with elongation or contraction from temperature variation.

The penetration of the static screw shaft through the drive shaft (area 3) can be sealed with an end cap 132 that provides room for the screw shaft 105 to grow (upward for elevated temperature operation) while maintaining closure of the end of the hollow drive shaft 134. This can be seen in the figures, for example at FIGS. 4 and 5.

Any access or drain ports, and component connection points (area 4), as well as input and output ports, can be sealed by flange and gasket combinations appropriate for temperature and pressure specification, by welding components together, or by other suitable pressure sealing mechanisms (i.e., gas tight sealing mechanisms).

In some embodiments, a gas supply 127a comprising a gas, for example, an inert gas, for example, nitrogen, can replace the air (or other process gas) thus filling and/or maintaining pressure in the closed system. In some other embodiments, reactive gasses, like hydrogen, can fill the closed system.

In some embodiments, a vacuum and/or pressure pump 127 can be used to evacuate/pressurize the closed system prior to filling it with the gas, and can maintain a desired pressure or vacuum of the gas via a pressure or vacuum regulator.

While the pressure sealing elevating conveyor 100 is shown to be approximately vertical, in other embodiments, a central axis of the pressure sealed elevating conveyor 100 can be at any other angle.

FIGS. 2 through 5 show a pressure sealed elevating conveyor similar to the pressure sealed elevating conveyor of FIG. 1, but with additional details showing operation of lifting bulk materials at very high temperatures, for example, three hundred to fifteen hundred degrees Fahrenheit. However, it should also be recognized that similar details can allow a pressure sealed elevating conveyor to operate at higher temperatures or low temperatures well below room temperature. In varying embodiments, low temperatures may include, but are not limited to temperatures below freezing, below 0 F, cryogenic temperatures (−238 F and below), and any temperatures in between. In varying embodiments, high and low temperature applications will be limited only by material limitations and selection.

It has been determined for a rotating lift tube and a static screw described herein for an elevator with a discharge height of about fifty feet, expansion of a rotating hot steel lift tube and expansion of the hot steel static screw in a length dimension at a temperature of fifteen hundred degrees Fahrenheit can be in the vicinity of 8½ inches. Other expansions are also possible with different temperatures, heights and materials of construction, as are contractions when used at cold temperatures. However, by using an expansion device, for example, a bellows 151, used as part of a pressure sealed shroud tube 110 described below, the pressure sealed shroud tube 110 can maintain a fixed overall length irrespective of the above expansions or contractions of the rotating lift tube and a static screw, thus allowing the discharge height and the connection to external equipment to remain fixed.

Figure 2:
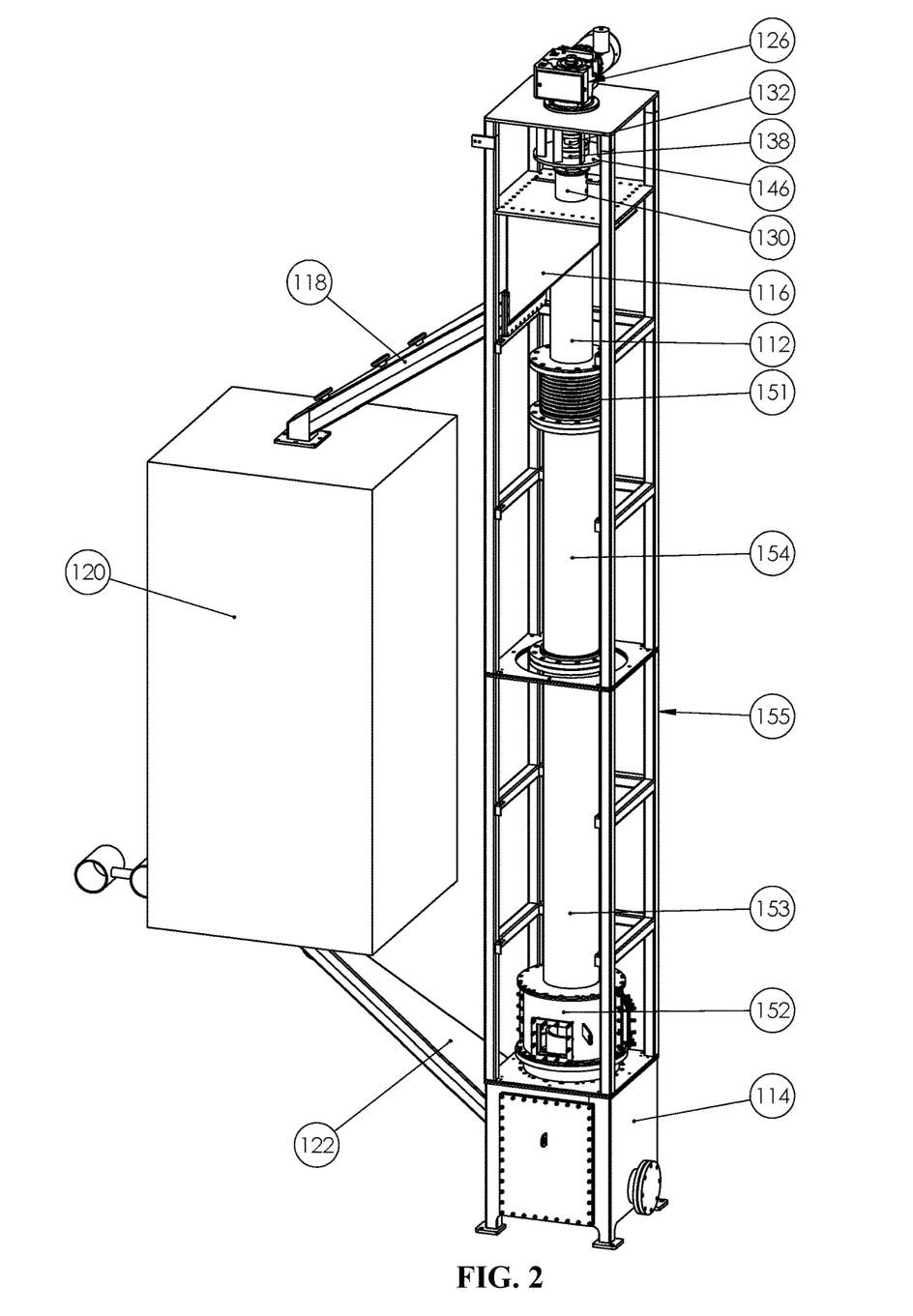
FIG. 2 is a diagram showing external details of an elevating conveyor capable of vertical lifting of a bulk material, the elevating conveyor having a pressure sealed surrounding shroud tube.
Figure 3:
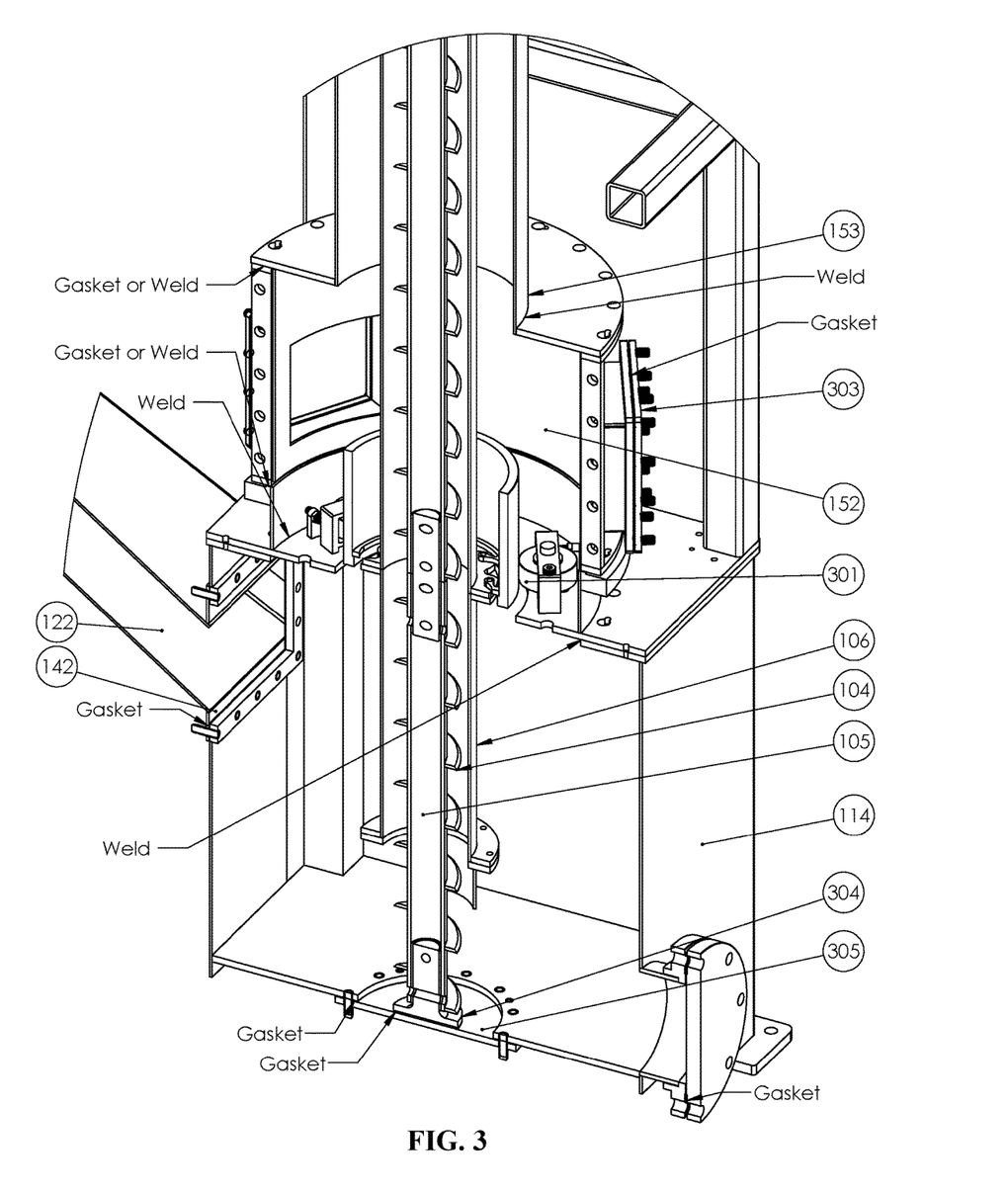
FIG. 3 is a cross sectional diagram showing an expanded view of the internals of a bottom portion of the elevating conveyor of FIG. 2.

The pressure sealed elevating conveyor of FIG. 1 includes a shroud 110, but is shown in FIG. 2 to comprise a plurality of shroud sections 152/153/154 coupled together by welding or with flanges with gaskets capable of maintaining pressure while exposed to extreme temperatures. Also, the shroud comprises one or more shroud bellows 151 operable to expand or contract along a longitudinal axis of the shroud 110. Use of the shroud bellows 151 allows a total length of the shroud 110 to remain substantially invariant with changes in temperature of the pressure sealed elevating conveyor.

The shroud 110 can also include one or more shroud bodies 152 with a wider diameter to surround centering bearings 301 that guide rotation of the rotating lift tube. The centering bearings 301 can be accessible by centering bearing access ports 303, fitted with high-temperature gaskets, in one or more shroud bodies 152.

In contrast, the static screw 103 and the rotating lift tube 106 can expand in length by several inches, for example, six inches. The static screw shaft 105 can be coupled to the elevator frame at its lower end, for example a screw removal plate 305. In contrast, the rotating lift tube can be coupled to the elevator frame at its upper end, the gearmotor 126. There can be a generous horizontal clearance between the outside diameter of the static screw and the inside diameter of the rotating lift tube. As temperature increases and thermal expansion occurs, the rotating lift tube can grow downward in length as it expands and the static screw can grow upward in length as it expands. To this end, an upper end of the rotating lift tube 106 can be held in place vertically within the discharge head by coupling to the lower squirrel cage 128, a hollow drive shaft 134, an upper squirrel cage 146, and a drive shaft 129 to a mounted drive motor 126, while the lower end of the rotating lift tube can be free to expand downward, sliding through and keeping centered by centering bearings 301.

Also to this end, a center shaft coupling 304 of the lower end of the screw shaft 105 can be mounted to a fixed support 305 in the feed hopper, while the upper end of the screw shaft 105 can expand upward through a hollow drive shaft 134, (which can pass through a discharge head seal housing 131 with internal discharge head rope seals 306 and lantern ring 307, all held in place with a discharge head seal plate 308), through a screw shaft rope 139 to center the shaft of the static screw, and into the end cap 132. Other arrangements of the hollow drive shaft and sealing ring are described above in conjunction with FIG. 1.

The amount of expansion growth is designed into the elevating conveyor 100 by way of selected vertical dimensions of elements of the elevating conveyor based on maximum operating temperatures anticipated, materials of construction and overall height. In operation at elevated temperatures, the rotating lift tube and the static screw do not touch each other as each expand and contract.

An upper squirrel cage can provide physical separation of the drive motor from the high temperature zone, as well as a fan to draw cooling air through the hollow shaft of the gearbox and general cooling of the surrounding components.

A frame 155 can surround the pressure sealed elevating conveyor providing structural support for the elevator, shroud and support for centering bearings 301 around the rotating lift tube.

In some embodiments, pressurized gas can be inserted into the lantern ring via piping 117 to provide positive pressure sealing and cooling of the seals themselves.

In some embodiments, the pressure sealed elevating conveyor can maintain for example ten pounds per square inch of pressure. However, pressures greater than or less than ten pounds per square inch are also possible.

In some embodiments, the pressure sealed elevating conveyor is filled with an inert gas, for example, nitrogen. However, other gases, inert or otherwise, can also be used. While the shroud tube is indicated to comprise a cylindrical tube, in other embodiments, a different shroud can have a different shape that can maintain a gas-tight seal.

In some embodiments, the shroud tube, the rotating lift tube, and the static screw are comprised of stainless steel. However, other materials of construction can also be used. In some embodiments, the overall length of the pressure sealed elevating conveyor is about sixty-two feet. However, lengths greater than or less than sixty-two feet are also possible.

In some embodiments, the shroud tube has a diameter of about seven inches. However, diameters greater than or less than seven inches are also possible.

In some embodiments, the shroud tube is fourteen inches in diameter. However, diameters greater than or less than fourteen inches are also possible to accommodate a variety of lift tube diameters, centering bearing configurations, and insulation layer positions either internal or external.

Referring now to FIGS. 4 and 5, the screw shaft 105, or an extension thereof, passes though the hollow drive shaft 134. A rope 139, positioned in the rope housing 138, centers the screw shaft but is not used to seal the hollow drive shaft opening. The rope is held in place with a rope plate 137. The rope housing 138 connects to the upper squirrel cage lower plate 146b. A seal cap 132 forms a seal with the rope housing thus enclosing the end of the hollow drive shaft that the screw shaft passes through.

As described above, in some other embodiments, the sealed cap is not used, and instead the DH Seal 130 is altered to provide both of the above-described seals. In these embodiments, the upper squirrel cage is optional.

All references cited herein are hereby incorporated herein by reference in their entirety.

Having described preferred embodiments, which serve to illustrate various concepts, structures and techniques, which are the subject of this patent, it will now become apparent that other embodiments incorporating these concepts, structures and techniques may be used.

Accordingly, it is submitted that the scope of the patent should not be limited to the described embodiments but rather should be limited only by the spirit and scope of the following claims.

Elements of embodiments described herein may be combined to form other embodiments not specifically set forth above. Various elements, which are described in the context of a single embodiment, may also be provided separately or in any suitable sub-combination. Other embodiments not specifically described herein are also within the scope of the following claims.

What is claimed is:

1. A pressure sealed elevating conveyor for non-ambient temperatures to move a material, comprising:
   an elevating conveyor, comprising:
      a rotatable lift tube;
      a drive shaft coupled to the rotatable lift tube allowing material discharging from a top end of the lift tube to pass into a discharge head;
      a static screw disposed within the rotatable lift tube, the static screw comprising a static screw shaft with attached screw flights, wherein a diameter of the rotatable lift tube and a diameter of the static screw are selected to be operable to move a material within the lift tube upward as the rotatable lift tube rotates, wherein the pressure sealed elevating conveyor for non-ambient temperatures further comprises:
         a shroud tube surrounding the rotatable lift tube of the elevating conveyor;
         a feed hopper coupled to a lower end of the shroud tube, wherein a coupling between the feed hopper tube and the shroud tube is pressure sealed;
         the discharge head having a discharge head top, the discharge head coupled an upper end of the shroud tube and wherein a coupling between the discharge head and the shroud tube is pressure sealed;
         an input port in the feed hopper, the input port operable to receive the material; and
         an output port in the discharge head.

2. The pressure sealed elevating conveyor for non-ambient temperatures of claim 1, further comprising:
   a hollow drive shaft passing through the discharge head top and coupled to the rotatable lift tube, the hollow drive shaft and the rotatable lift tube coupled by a lower squirrel cage; and
   a gas-tight sealing mechanism surrounding the hollow drive shaft.

3. The pressure sealed elevating conveyor for non-ambient temperatures of claim 2, further comprising:
   an upper squirrel cage positioned along the drive shaft, wherein the drive shaft is connected to a top plate of the upper squirrel cage, and the hollow drive shaft is connected to a bottom plate of the upper squirrel cage;
   a screw shaft cap wherein the screw shaft cap forms a gas-tight seal with the drive shaft while allowing a length of the static screw shaft to move linearly through the hollow drive shaft.

4. The pressure sealed elevating conveyor for non-ambient temperatures of claim 1, wherein the shroud tube comprises at least one bellows portion operable to expand or contract longitudinally due to low or high temperature, respectively.

5. The pressure sealed elevating conveyor for non-ambient temperatures of claim 4, further comprising a frame coupled to rigidly support the shroud tube.

6. The pressure sealed elevating conveyor for non-ambient temperatures of claim 2 wherein the gas-tight sealing mechanism surrounding the hollow drive shaft is operable to maintain a pressure seal with the discharge head and hopper as the rotatable lift tube expands or contracts in length in the presence of high or low temperature, respectively.

7. The pressure sealed elevating conveyor for non-ambient temperatures of claim 4 wherein the at least one bellows portion is operable to maintain the shroud tube and support frame at a substantially fixed length at low or high temperature.

8. The pressure sealed elevating conveyor for non-ambient temperatures of claim 4 wherein the static screw extends through at least a portion of the hollow drive shaft, the hollow drive shaft configured to allow an expansion or contraction in a length of the static screw.

9. The pressure sealed elevating conveyor for non-ambient temperatures of claim 3 wherein the upper squirrel cage is in communication with an exterior atmosphere and is configured to circulate air of the exterior atmosphere to cool the drive shaft.

10. The pressure sealed elevating conveyor for non-ambient temperatures of claim 4 wherein the conveyor is configured to operate at a high temperature or a low temperature.

11. The pressure sealed elevating conveyor for non-ambient temperatures of claim 4 further comprising an atmosphere of inert gas within a volume of the conveyor.

12. The pressure sealed elevating conveyor for non-ambient temperatures of claim 4 further comprising an atmosphere of reactive gas within a volume of the conveyor.

13. The pressure sealed elevating conveyor for non-ambient temperatures of claim 4 wherein a pressure within the conveyor is less than atmospheric pressure.

14. The pressure sealed elevating conveyor for non-ambient temperatures of claim 4 wherein a pressure within the conveyor is greater than atmospheric pressure.

15. The pressure sealed elevating conveyor for non-ambient temperatures of claim 4 wherein the lift tube is formed of multiple sections.

16. The pressure sealed elevating conveyor for non-ambient temperatures of claim 4 wherein the static screw is formed of multiple sections.

17. The pressure sealed elevating conveyor for non-ambient temperatures of claim 5 wherein at least one of the shroud tube and the frame is formed of multiple sections.

18. The pressure sealed elevating conveyor for non-ambient temperatures of claim 1 wherein the drive shaft is coupled to the rotatable lift tube by a squirrel cage.

19. The pressure sealed elevating conveyor for non-ambient temperatures of claim 1 wherein the input port of the feed hopper has a gas-tight sealing mechanism.

20. The pressure sealed elevating conveyor for non-ambient temperatures of claim 1 wherein the output port of the elevating conveyor being operable to expel the material, the output port having a gas-tight sealing mechanism.

* * * * *